United States Patent [19]

Ffooks

[11] 4,013,189
[45] Mar. 22, 1977

[54] INSULATION SYSTEM FOR LIQUIFIED GAS TANKS

[75] Inventor: Roger Cambridge Ffooks, Tittlesfold Farm near Billingshurst, England

[73] Assignee: Conch, Lng, Moorestown, N.J.

[22] Filed: Aug. 7, 1975

[21] Appl. No.: 602,807

[30] Foreign Application Priority Data

Aug. 8, 1974   United Kingdom ............. 35094/74

[52] U.S. Cl. ............................. 220/9 LG; 220/9 F; 220/15

[51] Int. Cl.² ......................................... B65D 87/24

[58] Field of Search ............ 220/9 F, 9 LG, 10, 15; 114/74 A

[56] References Cited

UNITED STATES PATENTS

| | | | |
|---|---|---|---|
| 2,512,308 | 6/1950 | Looper | 220/9 LG X |
| 3,150,794 | 9/1964 | Schlumberger et al. | 220/9 LG |
| 3,246,789 | 4/1966 | Progler | 220/15 |
| 3,547,302 | 12/1970 | Jackson et al. | 220/15 |
| 3,780,900 | 12/1973 | Yamamoto | 220/9 LG |
| 3,894,505 | 7/1975 | Murphy | 220/15 X |
| 3,927,788 | 12/1975 | Zinniger et al. | 220/9 LG |

*Primary Examiner*—William Price
*Assistant Examiner*—Stephen Marcus
*Attorney, Agent, or Firm*—Schiller & Pandiscio

[57] ABSTRACT

The invention relates to thermally-insulating containers particularly for liquefied gas tankers. It is known to use sprayed polyurethane foam for insulating the cargo tanks, but because of stresses in use load bearing "corners" are required for anchoring the layers. Such corners have previously been provided by the use of frames of balsa-wood. The invention provides the use of sheet material of curved configuration welded along the corners which are designed such that the foam can be applied directly thereto, the arrangement providing corners of sufficient strength for anchoring. The space behind the sheets may be filled with inert gas and can be used for water drainage.

7 Claims, 1 Drawing Figure

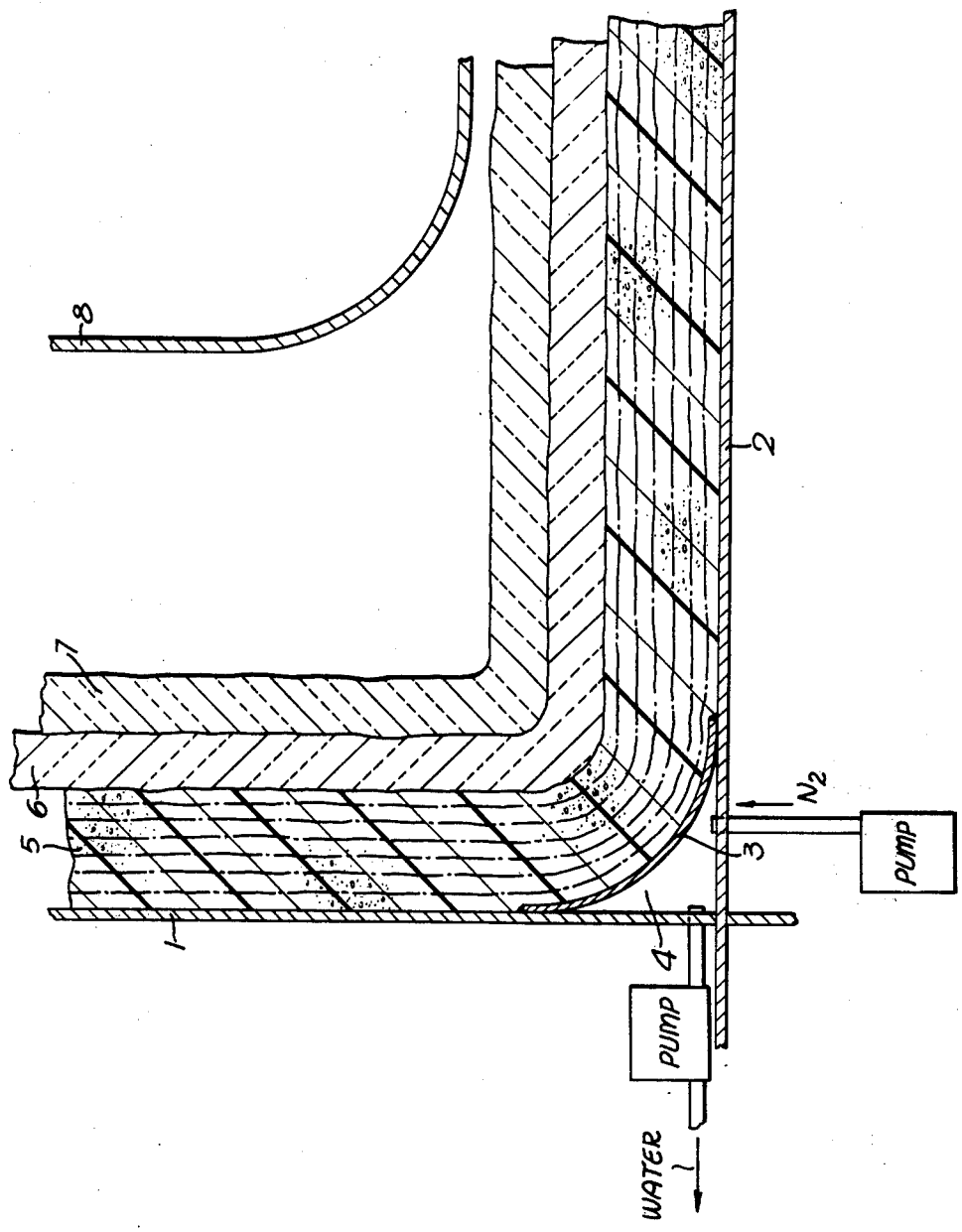

INSULATION SYSTEM FOR LIQUIFIED GAS TANKS

The present invention relates to thermally-insulated containers and has particular, although not exclusive, application to the overwater transportation of liquefied gas, especially liquefied natural gas in ocean going tankers.

It is known to transport liquefied natural gas in double-hulled tankers in which self-supporting aluminium alloy cargo tanks are maintained in position independently of the tanker's hulls by support pads of balsa or plywood bearing on the floor of the inner hull. The inner hull is lined internally with a layer of polyurethane foam adhered to said hull and covered with an inner layer of fibrous glass, the inner surface of which fibrous glass layer is spaced from the cargo tank. The polyurethane foam had adequate density, stability, strength, impermeability and resistance to cracking to act as a fluid-tight secondary barrier to protect the hull should the cargo tank spring a leak. However, the foam has a sufficiently large coefficient of thermal expansion to tend, when cooled by the presence of liquefied natural gas in the cargo tank, to shrink away from the inner hull at angular corners thereof. This problem has previously been overcome by providing in said corners, prior to application by spraying of the polyurethane layer, ribs of balsa or plywood to provide additional keying surface area for the foam.

Such an application is disclosed in our British patent specification No. 1,203,496 and in its patent of addition specification No. 1,301,368. It has now been found that said ribs can be replaced at a substantial cost saving (of the order of U.S. $1,000,000 per ship) with "load-bearing" sheet material extending across the respective corners to present a concavely curved surface to the polyurethane foam layer instead of the angular corner of the inner hull.

By load-bearing as used in this specification, we mean capable of bearing the load imposed or which might be imposed on the respective corner of the internally coated hull (or other container) in use. In the case of double-hulled tankers of the kind described above, said load would be that which could be imposed by leakage of liquefied natural gas from the cargo tank.

According to the present invention therefore, there is provided a thermally-insulated container having at least one angular corner and an inner lining of thermally-insulating material adhering to said container wherein load-bearing sheet material extends across said corner below the lining to present a concavely curved surface to the thermally-insulating material and said material adheres thereto.

As mentioned above, the invention has particular application to the inner hull of a double-hulled tanker previously referred to. It will be apparent other applications especially to the tanks in which a lique- tank located accomodating container polyurethane with a layer of polyurethane foa ered with a layer of fibrous glass.

The load-bearing sheet material can be of the sa or different material from that of the container itself and preferably is resiliently flexible to accommodate some contraction of the insulating material. Thus, in the case of mild steel containers, as exemplified by the inner hull of double-hulled tankers of the kind referred to, said sheet material preferably is mild steel plate.

The sheet material is appropriately secured such as by welding to the container at positions spaced across th corner in the desired curved concave configuratio The curvature of said plate, which usually will be ar ate, is calculated having regard inter alia to the lo bearing requirements and the nature and depth of insulating layer. In the case of corners formed bet two walls or wall portions, the sheet material can part-cylindrical shape (i.e. having a cross-section is a segment of a circle) and may conveniently from a cylindrical pipe of appropriate curvature the corner is at the junction of three or more wall portions, the sheet material can be part-s In either of said shaped sheet material, the ma extend tangentially from the curved portions to w facilitate welding or other attachment adjacent the respective corner.

The space formed between the curved of the co and the adjacent angular corner of desired, be filled with an inert gas or nitr for water drainage.

The following is a description, by only, and with reference to the accomp of an embodiment of the present inv to a double-hulled tanker for trans natural gas. The single FIGURE of cross-sectional view of a horizontall formed between an upright wall a inner hull of a double-hulled li tanker incorporating the present The liquefied natural gas tank of double hull, mild steel constru verse cofferdams into a number gular holds. The holds are insu faces in the manner described cargo boil-off and a liquid-tig tection for the full height of taining tanks accommodat fitted one to each hold and porting, flat-sided alumim balsawood supports distri respective holds and are top and bottom of the h described in our Bri 1,300,730, which is al specification No. 1,20

In accordance with lar corner in the hold late presenting a c In the c plates are welded together to complementary the transverse hold corners. Nitrogen is pumped into the space formed between the original hull corners and the said welded plates. Polyurethane foam is sprayed over the inner surfaces of the hold after welding said corner plates and fitting the balsawood supports but before insertion of the cargo tank. The foam is applied in several layers, typically 7, inter-spaced with nylon mesh reinforcing, until a depth of 6 inches of foam is built up. This layer is then itself covered with two layers of 3 inch fibrous glass. The dimensions are such that the cargo tank when fitted is some 18 inches from the exposed surface of the fibrous glass, although the gap can vary as between the floor, top and walls of the tankers and their adjacent inner faces of the insulation.

The figure shows in cross-section a typical corner of the hold, being a horizontally extending corner between a right wall 1 constituted by the tankers inner hull transverse bulkhead and a base wall 2 constituted by the bottom of the tankers inner hull. The corner is formed by a part-cylindrical 3/16 inch mild steel plate from a 9 inch radius cylindrical pipe and welded to walls 1 and 2 respectively. The space 4 between the original corner of walls 1 and 2 and the plate 3 are filled as described above with a 6 inch deep layer 5 of polyurethane foam which is itself covered with two 3 inch layers of fibrous glass 6 and 7 respectively.

Cargo tank 8 is shown in its located position in the cargo hold, the bottom of the tank being on balsa pads (not shown), as mentioned and the side walls thereof being spaced from inner faces of the insulation.

It will be appreciated that the invention is not restricted to the particular description above and that various modifications can be made within the scope of the invention. In particular, the load bearing sheet material can as well as right-angle as described.

What we claim is:
1. A thermally-insulating container comprising in combination;
 a. at least two adjacent metallic walls defining an angular corner;
 b. a load-bearing metallic corner plate extending across and spaced from said angular corner, said plate (i) being resiliently flexible; (ii) having a concavely curved surface; and (iii) being rigidly attached by welding to the said at least two adjacent walls along its edges; and
 c. an inner lining of a thermally insulating material which is (i) a foamed plastic (ii) applied directly onto said walls and said corner plate.

2. A container according to claim 1, wherein said thermally-insulating material comprises a polyurethane foam which is (i) sprayed in layers (ii) in a known manner (iii) directly onto said walls and said corner plate.

3. A container according to claim 2 further including at least one layer of fibrous glass covering said foam.

4. A container according to claim 1, wherein said corner plate is formed of the same material as said walls, and is sufficiently resiliently flexible to accommodate, in use of said container, any thermal movement of the thermally insulating material applied thereto.

5. A container according to claim 4, wherein said corner plate comprises part-cylindrical elongated plates welded along their longitudinal edges to those corners formed between two adjacent wall portions, and part-spherical plates welded adjacent each junction of three wall portions, said part-spherical plates being contiguous with said part-cylindrical plates, said plates being welded together to define a sealed space with said angular corner.

6. A container according to claim 5, and further comprising pump means connected to said sealed space for filling the latter with an inert gas.

7. A container according to claim 6, and further comprising pump means connected to said sealed space for water drainage.

* * * * *